United States Patent Office 3,325,980
Patented June 20, 1967

3,325,980
DEVICE FOR PROVIDING RELATIVE LEAK-TIGHTNESS BETWEEN TWO PARTS WHICH ARE MOVABLE WITH RESPECT TO EACH OTHER
Jean Chameroy, Guyancourt, and Jean Laxague, Chatenay-Malabry, France, assignors to Groupement Atomique Alsacienne Atlantique, Le Plessis-Robinson, Seine, France
Filed Nov. 19, 1963, Ser. No. 324,616
Claims priority, application France, Nov. 20, 1962, 916,044
2 Claims. (Cl. 55—422)

The present invention relates to a device which provides relative leak-tightness between two parts which are movable with respect to each other.

It is sometimes necessary under certain circumstances to introduce different filter capsules in a loop system through which a gas is circulated in a continuous manner, said filter capsules being designed to retain the solid or other particles transported by the circulating gas in order that said particles may either be examined or removed. It accordingly follows in particular that such a method can be applied to burst can detection in nuclear reactors of the gas-cooled type. To this end, the gas which is derived from the coolant channel which it is desired to check is brought in the presence of filter capsules and caused to flow through said capsules. However, the gas is previously caused to flow through a volume which is sufficient to ensure that, if fission products and in particular krypton and xenon are contained in said gas, these products have time to disintegrate so as to form solid particles of rubidium and caesium. These particles can then be collected by the filter, said filter being chosen and designed with a view to providing a degree of leak-tightness which is sufficient to cause the gas to flow either totally or partially through said filter. The presence of the aforesaid particles in the filter can then be detected on completion of the filtering operation.

The object of the present invention is to produce a device which serves to provide relative leak-tightness between two parts which can be displaced rapidly with respect to each other, said leak-tightness being effective only when said parts are rendered motionless.

The invention is accordingly directed to a device which comprises at least one filter capsule and which makes it possible when a capsule of this type is introduced in a gas circulation loop either to make provision during certain sequences of operation for a degree of leak-tightness which is sufficient to ensure that a substantial proportion of the circulation gas effectively flows through the capsule while only permitting a small proportion of the flow to be diverted through a by-pass, or alternatively to make provision during the other sequences of operation for a fairly substantial diversion so that practically the entire gas flow passes through said by-pass and only a small proportion of the flow passes through the capsule.

As will be apparent, it would also be feasible to achieve the necessary relative leak-tightness by means of rubbing surfaces which are placed in contact with the capsule with a small clearance. However, in view of the order of magnitude of such a clearance which would be necessary in order to obtain sufficient leak-tightness, this latter solution would result on the one hand in the need to have available a substantial amount of power in order to overcome friction forces during the movement of the parts and, on the other hand, in the wear of the parts in contact which would rapidly eliminate initial leak-tightness. In point of fact, a system for taking up play would not overcome the first drawback and in the second case would have only limited effectiveness.

The device in accordance with the present invention obviates the disadvantages noted above.

Accordingly, said device mainly consists of a movable member which passes with a certain clearance through a conduit in which a gas is circulated, said member being provided with at least one shouldered orifice which is intended to receive a filter capsule carried by a support which is slidably fitted in said orifice, and an attraction system which exerts on said support a force which is sufficient to lift and bring the filter capsule into cantact with the rim of the conduit.

The movable member preferably consists of a circular disc which is rotatable about its axis, said disc being provided with a plurality of orifices, the centers of which are located on a circle concentric to the disc axis.

The system for the attraction of each capsule can be constituted by a spring, a magnet, an electromagnet or any other suitable system, springs or the like being fitted inside the orifices of the disc for the purpose of centering the capsules and for continuously urging these latter against the shouldered portion of each orifice.

Aside from the main characteristic features which have been summarized above, the device in accordance with the present invention is characterized by other secondary features, as will be explained in greater detail in the description of one example of embodiment which follows below, and which is given solely by way of illustration without implied limitation, reference being made to the accompanying drawings wherein.

Figure 1:
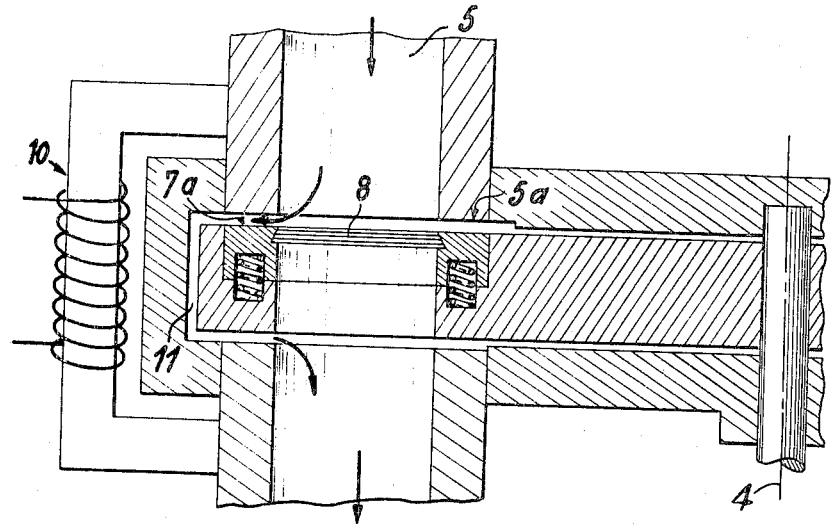
FIG. 1 is a diagrammatic sectional view of the device in accordance with the invention, the filter capsule being in the withdrawn position relatively to the gas intake orifice.

As can be seen from these figures, the device essentially consists of a body 1 comprising a circular chamber 2, a disc 3 which is adapted to rotate within said chamber and which is pivotally mounted about its axis 4, a cylindrical conduit 5 which traverses said chamber and through which the gas to be observed is intended to flow.

The disc 3 is provided with one or a plurality of orifices 6 each provided with a shouldered portion 6a against which an annular support 7 can be applied, there being retained in said annular support a filter capsule 8. The support 7 together with its capsule 8 are capable of sliding vertically within the orifice 6 of the disc 3, while a restoring member which consists, for example, of tension springs 9 tends to center the capsule within its support and to maintain the assembly which is constituted by said support and said capsule constantly seated against the shouldered portion 6a.

Furthermore and in accordance with the invention, each support is designed to be attracted against the bottom rim 5a of the conduit 5 in such manner that the filter capsule 8 obturates said conduit. To this end, the device comprises an attraction system advantageously constituted by an electromagnet 10 which applies on the support a force which is directed upwards, that is to say in the direction opposite to that which results from the springs 9 which tend to hold the support 7 applied against the corresponding shouldered portion 6a. The force exerted by the electromagnet must be greater than that which results from the pressure drop of the gas across the capsule which accordingly obturates the conduit 5.

A fairly substantial clearance is allowed between the walls of the chamber 2 and the disc 3 so as to avoid any danger of jamming. The uppermost face 7a of the support 7 and the bearing face 5a of the conduit 5 are machined with a tolerance such that any leakage outside the capsule is smaller than that which has been permitted in advance.

Figure 2:
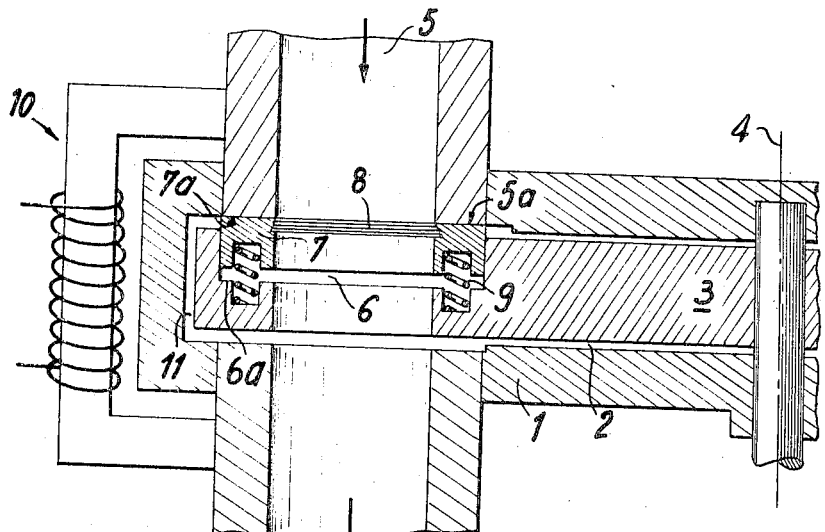
FIG. 2 is a view of the same device showing the filter capsule in the position of obturation.

The operation of the device is as follows:

When the disc 3 is caused to rotate and brought to a standstill in a position such that a capsule 8 is placed opposite the conduit 5, said capsule and its support 7 are located at a certain distance away from the gas intake orifice, as shown in FIG. 1. When the attraction electromagnet 10 is energized, the face 7a of the support 7 comes into contact with the bearing surface 5a and the desired leak-tightness is thus achieved (as shown in FIG. 2) in the manner which has been previously described.

On the contrary, if it is desired that the gas flow should not pass through the capsule while the disc is rotating or if it is found desirable to prevent the gas from flowing through the capsule when this latter is in position opposite the conduit 5, it is therefore merely necessary to interrupt the supply of current to the electromagnet and to allow the flexible springs 9 to return the capsule 8 to the position of FIG. 1 or, of course, to allow said capsule to remain in position if the lifting movement previously referred-to has not already been imparted to said capsule. In fact, in this position of the capsule, the gas stream flows through a passage 11, the dimensions of which are sufficiently large to conduct practically the entire quantity of gas while an insignificant proportion of this latter flows through the capsule alone.

It will be understood that the invention is not limited to the form of embodiment which has been described and illustrated and which has been given solely by way of example. In particular, the system for attracting the support could be constituted by any device other than an electromagnet, and especially by springs or alternatively by a permanent magnet.

What we claim is:

1. A device for providing a substantially leakproof seal between relatively movable elements, comprising: a pair of conduits having opposed and spaced apart adjacent ends; a disc mounted for rotation about an axis adjacent said conduits and having an edge portion between and spaced from said adjacent ends whereby said edge portion may be moved into and out of the space between said conduit ends; at least one opening through said disc in alignment with said conduits; an annular support in said opening and slidably mounted therein for movement toward and from sealing engagement with an adjacent end of one of said conduits; a filter capsule spanning the interior of said annular support; spring means between said disc and support and urging said support away from said one conduit end and toward said disc; selectively operable means for moving said support into sealing engagement with said one conduit end, against the action of said spring; and means defining an enclosure housing said disc and said adjacent ends.

2. A device as defined in claim 1 wherein said selectively operable means comprises an electromagnet arranged adjacent said conduit ends to provide a magnetic field extending across any gap between said support and said one conduit end.

References Cited

UNITED STATES PATENTS

| 2,143,655 | 1/1939 | Heller | 210—429 |
| 2,402,964 | 7/1946 | Hoffstrom | 251—139 |
| 2,502,591 | 4/1950 | Ray | 251—141 X |
| 2,695,685 | 11/1954 | Jamison | 251—139 X |
| 2,838,084 | 6/1958 | Samler | 210—324 X |
| 2,840,183 | 6/1958 | George | 55—309 X |
| 2,912,003 | 11/1959 | Lagerwey | 137—547 |
| 2,964,286 | 12/1960 | Hoskins | 251—139 X |
| 2,973,833 | 3/1961 | Cook | 55—511 X |
| 2,974,749 | 3/1961 | Donguy | 55—511 X |
| 3,047,024 | 7/1962 | Schuller | 251—159 X |
| 3,059,470 | 10/1962 | Baldwin et al. | 55—422 X |
| 3,109,457 | 11/1963 | Oliveau | 251—159 X |
| 3,138,015 | 6/1964 | Avery | 73—28 X |

FOREIGN PATENTS 1,213,058   10/1959   France.

HARRY B. THORNTON, *Primary Examiner.*

D. TALBERT, *Assistant Examiner.*